United States Patent [19]

Junge et al.

[11] Patent Number: 5,030,910

[45] Date of Patent: Jul. 9, 1991

[54] METHOD AND APPARATUS FOR SLICING CRYSTALLINE WAFERS AIDED BY MAGNETIC FIELD MONITORING MEANS

[75] Inventors: Joachim Junge, Burgkirchen; Johann Glas, Burghausen; Johann Niedermeier, Burgkirchen; Gerhard Brehm, Emmerting, all of Fed. Rep. of Germany

[73] Assignee: Wacker-Chemitronic Gesellschaft fur Elektronik-Grundstoffe mbH, Burghausen, Fed. Rep. of Germany

[21] Appl. No.: 384,563

[22] Filed: Jul. 24, 1989

[30] Foreign Application Priority Data

Aug. 5, 1988 [DE]  Fed. Rep. of Germany ....... 3826698

[51] Int. Cl.⁵ .............................................. G01B 7/14
[52] U.S. Cl. ................................................ 324/207.15
[58] Field of Search ................. 324/207, 208, 66, 67, 324/326–329, 226, 225, 207.15, 207.16

[56] References Cited

U.S. PATENT DOCUMENTS 4,198,006  4/1980  Rolfe .............................. 324/208 X
4,205,797  6/1980  Bennett, Jr. et al. ........... 324/208 X
4,438,754  3/1984  Nanny et al. .................... 324/207 X

*Primary Examiner*—Kenneth Wider
*Assistant Examiner*—Warren S. Edmonds
*Attorney, Agent, or Firm*—Collard, Roe & Galgano

[57] ABSTRACT

In a method and apparatus for monitoring the path of the cut in slicing wafers from non-magnetizble crystalline workpieces with a slicing tool which is moved through the workpiece, a measuring unit is disposed in a defined position with respect to the slicing tool and a constant magnetic field is established between the measuring unit and the slicing tool. The magnetic field during the slicing process passes at least partly through the wafer to be sliced off and varies with deviations of the slicing tool from the required line of cut established between the fixed measuring unit and the slicing tool. By measuring the change in the constant field caused by the deviation of the slicing tool, the slicing tool can be brought back into the required direction again by regulation so that wafers with excellent planarity are obtained.

12 Claims, 2 Drawing Sheets

METHOD AND APPARATUS FOR SLICING CRYSTALLINE WAFERS AIDED BY MAGNETIC FIELD MONITORING MEANS

BACKGROUND OF THE INVENTION

This invention relates to a method and apparatus for continuously or periodically monitoring the path of the cut in slicing wafers from non-magnetizable workpieces. More particularly, it relates to such a method and apparatus employing a slicing tool which is moved through the workpiece and which is manufactured at least partly from magnetizable material, wherein the magnetic interactions between the slicing tool and a measuring unit are measured.

DESCRIPTION OF THE PRIOR ART

The slicing of wafers of high geometrical perfection from usually bar-shaped or block-shaped workpieces is of great importance, especially in the semiconductor field. For example, the wafers which are sliced from bars of elemental semiconductors such as silicon or germanium or compound semiconductors, such as gallium arsenide or indium phosphide and which are, as a rule, about 0.1 to 1 mm thick, are processed further to form the actual electronic components. With the ever higher integration of components, the requirements imposed on the geometrical quality of the required starting material (i.e., the wafers) are also increasing. The same applies to the slicing of oxidic materials such as, for instance, gallium gadolinium garnet, ruby or spinel, of glasses based, for example, on quartz, or of some ceramic materials where the geometrical precision of the sliced wafers or the faces remaining on the workpiece after slicing the wafers is also of considerable importance. High accuracy is also required in cutting up blocks of solar-cell base material such as, e.g., cast silicon, into smaller individual blocks and slicing the latter into wafers, even though the requirements are not so strict as, e.g., in the case of material for producing electronic components.

Annular saws are primarily used in these slicing methods, although for certain applications, rim slicing saws or ribbon saws are also used. In these cases, the saw blade or ribbon, is provided with a cutting edge or cutting face, which effects the actual material removal and serves as the actual slicing tool. This cutting edge may be in the form of a coating which surrounds the saw blade rim and in which cutting grains composed of hard material are embedded, and which in cross-section, has a drop-shaped profile. In the case of annular saws for slicing silicon bars, this cutting edge is frequently composed of nickel with diamond particles embedded in it. The saw blade or ribbon itself is typically manufactured from suitable steels.

In the slicing operation, the moving cutting edge gradually works through the workpiece, in which process a cooling and lubricating agent which, on the one hand, has the task of removing the heat evolved and, on the other hand, serves to remove the abraded material from the sawn slit, is additionally fed, as a rule, to the slicing point. In the course of the slicing operation, more or less severe deviations of the actual slicing slit from the ideal cutting line repeatedly occur, since the forces occurring during sawing deflect the slicing tool from the ideal cutting position. Especially in the case of large bar diameters of about 10 to 20 cm, this may have the result that the product obtained no longer meets the requirements and has to be discarded. A number of these aspects are discussed with particular reference to annular saws in the paper entitled "ID Technology for Large Diameters" by R. L. Lane, *Solid State Technology*, July, 1985, pp. 119-123.

Methods and apparatuses which make it possible to measure the path of the cut and deviations of the slicing tool from the ideal position, to be specific, even during the slicing operation, are, therefore, acquiring particular importance. A possible monitoring system is generally described in the paper by P. R. Carufe et al "System for Controlling Saw Blade Excursions During the Slicing of Silicon Crystals," which appeared in the *IBM Technical Disclosure Bulletin*, Vol. 25, No. 5, October, 1982. In this case, a sensor which measures the reluctance is used to convert the deviation of the saw blade during sawing into a voltage signal, on the basis of which a control unit attempts to guide the saw blade back into the required position with the aid of fluid. However, this system only measures the path of the saw blade outside the sawn slit.

This principle of measurement is employed, for example, by the known eddy current sensors in which eddy currents are used in the monitored slicing tool by means of an electromagnetic coil with high-frequency alternating current flowing through it. Depending on distance, these currents produce, in turn, impedance changes from which a voltage change proportional to the distance can then be ultimately derived. Experience shows, however, that such eddy current measurements are affected by the cooling and lubricating agent, generally water containing surfactants, which is unavoidable in the sawing operation and which often adheres to the slicing tool. Such measurements are also affected by the workpiece itself, for example, in the case of lower-resistance semiconductor material such as highly doped silicon, or alternatively by sawing aids such as graphite cutting strips, and are, therefore, not always completely reliable. In particular, this method is not suitable for obtaining measurements from which the most accurate information on the slicing operation may actually be expected, since it does not track the deviation of the slicing tool from the target path of cut inside the workpiece.

SUMMARY OF THE INVENTION

It is, therefore, an object of the invention to provide a method and an apparatus which makes it possible to monitor the path of cut inside the workpiece reliably and reproducibly during the slicing operation.

It is a more particular object of the present invention to provide such a method and apparatus with an accuracy which even makes it possible to measure deviations in the $\mu m$ range without interference.

Unexpectedly, it was found that although the above-mentioned interferences and distortions in monitoring the path of the cut inside the workpiece occur if an electromagnetic alternating field is used as the reference point quantity, they do not occur if a constant magnetic field is used.

The object is, therefore, achieved by a method according to the invention which comprises establishing a constant magnetic field between a measuring unit and the slicing tool which, during the slicing process, passes at least partly through the wafer to be sliced off and measuring the change in the constant field caused by the deviation of the slicing tool.

These objects are also achieved by an apparatus according to the present invention suitable for carrying out the method which comprises a measuring unit which makes it possible to produce a constant magnetic field and to measure changes therein. The measuring unit is disposed in a defined position with respect to the slicing tool in a manner such that, during the slicing operation, the constant field interacts with the slicing tool, at least partly, through the wafer to be sliced off.

Permanent magnet and electromagnets are equally suitable for producing the constant magnetic field. Examples of suitable magnetic materials are especially ferro magnetic materials such as some Cr, W and Co steels or the alloys described as Alnico, optionally modified with Nb and/or Ti, Cunifer, Coerox or Coercit or, alternatively, iron-free Heusler alloys. Magnets based on various ferrites of the spinel, garnet and hexagonal type can also be used. In addition, mention may also be made of the rare-earth metal (RE)-cobalt alloys of the type $RECo_5$ and $RE_2Co_{17}$, particular with RE=Pr, Sm and other lanthanoid metals, and also materials of the composition $Nd_2Fe_{14}B$. In selecting the suitable magnetic material, it is particularly important that the force of attraction exerted during the slicing operation on the slicing tool, for example, an annular saw blade, does not result in an unacceptable deflection with respect to the desired required line of cut. This also applies to the use of electromagnets which can be constructed in the known manner, for example, as soft iron cores surrounded by a coil.

The magnetic active materials selected to produce the constant magnetic field may be used, for example, in the form of bar magnets. In another, more advantageous embodiment, an annular-gap magnet is employed in which a central pole constructed as a ring or cylinder is surrounded concentrically by the opposite annular pole, a screen advantageously being provided between the two poles. Such annular-gap magnets have the advantage that the field lines pass through the plane of the measurement zone virtually perpendicularly and, therefore, also encounter the slicing tool essentially perpendicularly. This results in the metrologically advantageous virtually linear relationship between the distance of the magnet from the slicing tool and the force of attraction prevailing between them. A further advantage is that the magnetic field vanishes again close behind the plane of measurement, so that effects due to ferro magnetic objects or apparatus components present in the surroundings, such as, for example, the bar mounting, bar feed system or the advance system in the case of annular saws, which are usually of steel, or also tools, are limited to a minimum. Obviously, use may also be made of differently constructed magnets, such as, for example, horse shoe magnets, or magnets or annular-gap magnets having, e.g., a square, rectangular, or even kidney-shaped or banana-shaped cross-section, provided the constant fields produced by them have the above-mentioned properties.

It has also proved advantageous, especially in regard to the effects due to extraneous ferro magnetic material, to focus the magnetic field produced essentially only on the slicing tool and to render its components pointing in the other spatial directions inoperative. This can be done by surrounding the magnet itself and/or the measuring unit in the region facing away from the slicing tool with a screen which eliminates any interference with the measuring operation caused by outside magnetic phenomena. For example, surrounding walls of magnetizable materials may be used as a screen. For this purpose, magnetically soft and, therefore, not permanently magnetic materials, such as, for instance, various iron sheet materials, are preferred, which are advantageously primarily used in conjunction with a bar magnet. A more elegant solution to this problem is represented by the annular-gap magnets already mentioned and preferably used, in which the field lines essentially run in the interior of the magnet on the sides facing away from the slicing tool, with the result that the latter is particularly effectively screened and unaffected by external factors.

Between the magnet and the slicing tool, i.e., the saw blade of an annular saw, rim slicing saw, or ribbon saw, which is at least partly manufactured from magnetizable material, a constant magnetic field is built up which varies, in turn, with respect to the increased or decreased spacing of the slicing tool, i.e., with respect to the deviation of the slicing tool from the starting position relative to the magnet.

This variation in the constant magnetic field can be measured by measuring the force of attraction between the slicing tool and the magnet. Commercially available force transducers can be used for this purpose, provided they have the required sensitivity. Suitable systems are, for example, those based on pressure strain gauges, those based on induction, capacitance or semiconductors, or those based on pressure-dependent resistance elements such as are used, for example, in telephone transmitter capsules. Equally suitable are optical systems or piezoelectric elements, but no absolute measurements can be carried out with the latter.

Another possibility for measuring the variation in the constant field is to use Hall probes in which the variation in the field results in a voltage variation. Such Hall probes have the advantage that they do not require any mechanically moving parts and are, therefore, relatively insensitive to distortions. Their use in measuring magnetic fields is known and familiar to a person skilled in the art.

In addition, the use of other measuring instruments which also measure the flux density of the magnetic field, such as, for example, field plates or current balances, is also conceivable.

The measurement supplied by the force transducer or the Hall probe may be read off on an indicating device, optionally with a measurement amplifier interposed, and/or be used as output signal for a manual or automatic regulating device which affects the path of the slicing tool. As an example of such a regulation, reference may be made to the procedure which is described in DE-A- 3,640,645.

It has proved advantageous to provide the measuring unit with a encapsulation, especially if it is constructed as a magnet having a force transducer linked thereto. This serves to substantially exclude disturbing extraneous effects due to air flows, water spray or, alternatively, due to the short-term temperature variations frequently occurring in slicing operations. Non-ferromagnetic materials such as, for example, metals such as copper or aluminum or plastics such as, for example, polypropylene, polyethylene or polytetrafluoroethylene are particularly suitable for the encapsulation.

In the case of force measurement, it is particularly important to install the measuring unit in a defined position which does not vary during the slicing operation, with respect to the slicing tool. This is needed to prevent the measurement result from being distorted by a change in position caused, e.g., by a slight tilting of the sensor. Owing to the absence of mechanically moving parts, Hall probes are less sensitive in this respect. It is also possible to provide facilities which afford the ability to adjust or change the position in a defined manner, for example, with the aid of adjustment screws. This is especially useful if, e.g., workpieces of different dimensions or wafers of different thickness are to be sawn.

Beneficially, the measuring unit is positioned level with the cutting edge, since this is where deviations from the required cutting plane make themselves most immediately evident. This arrangement also has the advantage that the nickel usually used to embed the cutting grains is magnetically active so that the method according to the invention can also be used if the saw blade itself is manufactured from magnetically inactive or only weakly active materials such as, for instance, some steel alloys.

In relation to the workpiece, the position of the measuring unit is advantageously chosen so that the slicing tool can be monitored over as large a section as possible of its path through the workpiece. In sawing up bars of circular cross-section, a position is, therefore, advantageously established in which the measuring unit traverses a region running from the top of the bar via the center axis to the base of the bar in accordance with the relative movement between the workpiece and the slicing tool. This position is not, however, mandatory. The measuring unit may also be disposed in a laterally displaced manner with respect to it; specifically, it may advantageously be disposed within a zone deviating therefrom by about two thirds of the bar radius to the left or right. With still greater displacement, there is the danger, in particular in the case of large bar diameters, that deviations of the saw blade are no longer fully measured.

It is not absolutely necessary to cause the measuring unit to exclusively traverse the wafer to be sliced off during the entire slicing operation. Arrangements are also conceivable in which the wafer to be sliced off only comes between the measuring unit and the slicing tool intermittently or in which parts of the wafer to be sliced off and parts of the slicing tool no longer in contact with, or not yet in contact with, the workpiece are simultaneously traversed by the measuring unit during the slicing operation. This is the case, in particular, for magnets with a cross-section shaped to match the cutting edge contour, for example, a kidney-shaped cross-section.

It is possible to monitor the path of the cut all the more accurately, the greater the monitored region of the contact length of the slicing tool during the slicing operation. It has, therefore, proved beneficial to shape the magnets used in each case in a manner such that the constant field produced by them at least partly traverses this contact length. Another possibility is to arrange a plurality of magnets along the contact length so that the latter is partly or completely covered by the measurement. In this case, an integrating measurement may be made so that the signals supplied by all the magnets are combined into one measurement. It is, however, also possible to make each magnet measure the field variations individually.

According to an advantageous embodiment of the invention, at least one measuring unit is additionally provided which measures the deviation of the slicing tool outside the wafer to be sliced off. Advantageously, a measuring unit is also used for this purpose, by means of which a constant magnetic field is produced relative to the slicing tool in the manner explained above and whose variation is measured during the slicing operation and, optionally, also before or afterwards. In principle, other suitable instruments such as, for example, eddy current or optical sensors can, however, also be used for this purpose.

As a general rule, the path of the cut is continuously monitored in the method. It is, however, also possible to carry out this monitoring periodically, for example, at certain intervals or for certain relative positions between the workpiece and the slicing tool.

BRIEF DESCRIPTION OF THE DRAWING

Other objects and features of the present invention will become apparent from the following detailed description considered in connection with the accompanying drawing, which disclose several embodiments of the invention.

In the drawings, wherein similar reference characters denote similar elements throughout the several views.

DETAILED DESCRIPTION OF THE PREFERRED EMBODIMENT

Figure 1:
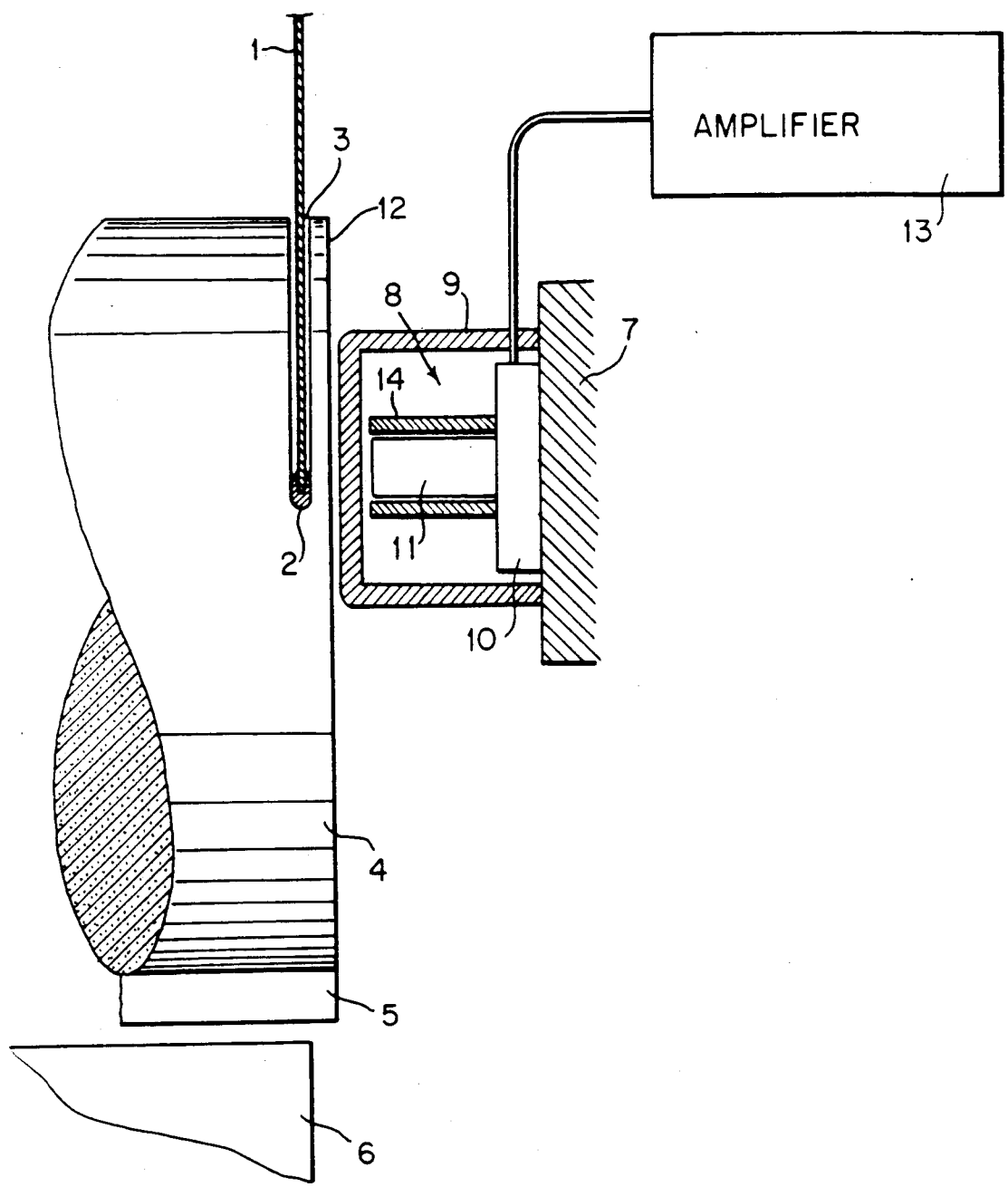
FIG. 1 is a schematically-illustrated side elevational view, in part section, of an apparatus according to the present invention.

The figure shows diagrammatically an annular saw blade 1 manufactured, for example, from rolled steel whose cutting edge 2 is composed, e.g., of a nickel sheath having a drop-shaped cross-section and diamond grinding particles embedded therein. The saw blade rotates with a speed of about 500 to 3,500 rpm and works its way into the workpiece 4, e.g. a silicon bar cemented onto a graphite cutting strip 5, with the creation of a sawn slit 3. The workpiece platform 6, which brings about the advance of the bar in the direction of the cutting edge, is only indicated diagrammatically here for reasons of clarity.

A measuring unit 8 is disposed in a defined position with respect to the slicing tool, i.e., the saw blade and the cutting edge, by means of an adjustable mounting 7, which is only indicated diagrammatically for reasons of clarity. The measuring unit comprises a dome-shaped encapsulation or sheath 9 manufactured, for example, from aluminum. Sheath 9 encloses the magnet 11, which is linked to a force measuring device 10, such as a force gauge.

In this arrangement, there is produced between the end face of the magnet 11 and the saw blade/cutting edge system a constant magnetic field which penetrates the interposed air gap, the encapsulation 9 and, in particular, the wafer 12 to be sliced off. If the saw blade now moves towards the magnet or away from it during the slicing operation, the force of attraction existing between the two, and consequently the value measured with the aid of the force transducer, changes correspondingly. The measurement signal which is registered, for example, by means of a measurement amplifier 13 may optionally be transmitted further, e.g., to a regulating device.

Optionally, the magnet 11 can be surrounded with a screen 14 of e.g. magnetizable material, which eliminates influences of outside magnetic phenomena on the measuring operation and, at the same time, renders the components of the magnetic field produced by the magnet 11, which point in the other spatial directions, inactive, so that the slicing tool is essentially encountered by the magnetic field lines perpendicular thereto.

Figure 2:
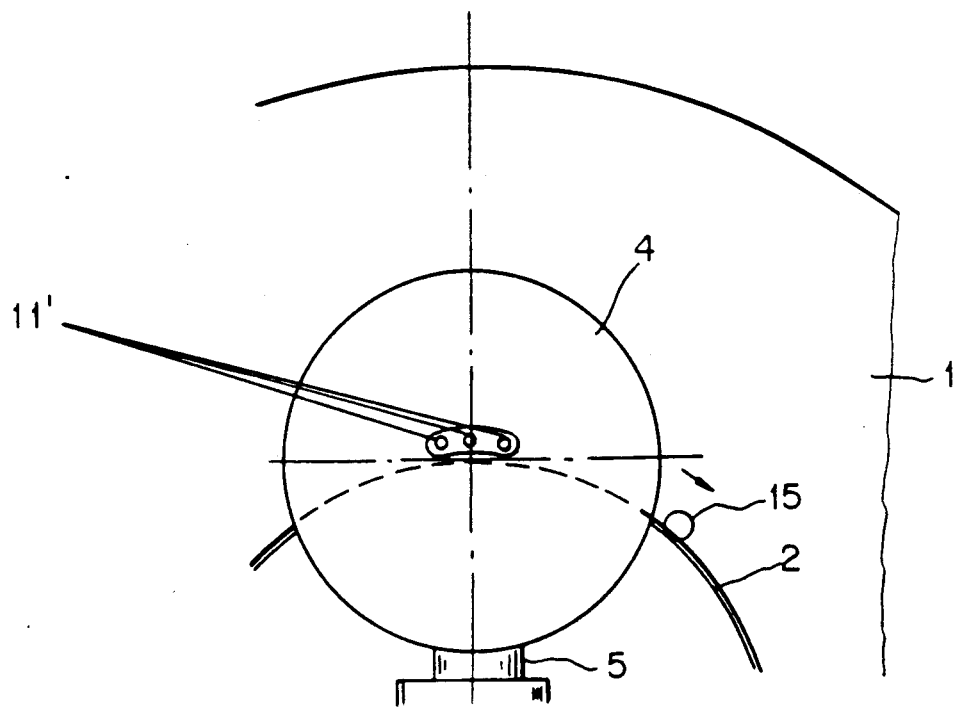
FIG. 2 is a schematically-illustrated front view of an alternate embodiment of the apparatus.

According to FIG. 2, the measuring unit can also include a plurality of magnets 11, distributed over an area to establish a constant magnetic field. Optionally, an additional measuring device 15 can be provided for measuring the deviation of the saw blade 1 and/or the cutting edge 2 during the cut outside the workpiece 4 cemented on cutting strip 5.

The measuring unit may be calibrated, for example, by means of an optical comparison system in relation to the dependence of the force of attraction on the deflection of the saw blade after it has been brought to the desired defined position.

The starting position consequently provides the reference value corresponding to the undisturbed saw blade path. Deviations of the saw blade from the target required value can be measured and eliminated again, for example, by means of regulating devices.

The method and apparatus, according to the invention, consequently make it possible to detect the development of errors even during the slicing operation and directly at the point of occurrence with a resolution down into the range of about 0.1 $\mu$m and to counteract them in good time. In sawing of semiconductor wafers, it is, therefore, possible, in particular, to minimize the convexity or lack of planarity, described as "warp" of the wafers or even to influence it in a controlled manner, i.e., to saw wafers with a particular "warp." The geometrical precision of the wafers can, therefore, ultimately be markedly increased as a result. Possible applications are, in particular, in the field of annular saws, but also in rim slicing saws or in ribbon saws. Potential workpieces are, in particular, bars or blocks of the non-magnetizable materials mentioned above, but also of other materials which do not unacceptably affect the constant magnetic field.

The invention is explained in more detail below with reference to a exemplary embodiment:

EXAMPLE

A commercial annular saw (saw blade diameter approximately 68 cm, inside hole diameter approximately 23.5 cm, saw blade of approximately 150 $\mu$m thick steel with nickel/diamond coating of approximately 300 $\mu$m thickness at the cutting edge) was provided with a mounting on which a measuring unit was mounted. This comprised an annular-gap permanent magnet (diameter approximately 15 mm, length approximately 20 mm, material Alnico) which was linked by screws to a commercial force transducer operating on the strain gauge principle. The unit was encapsulated in a polyvinyl chloride casing. The end face of the magnet was aligned parallel to the plane of the saw blade so as to produce a gap of approximately 3 mm; its lower edge was level with the cutting edge, to be specific, in the region of the crest of the saw blade. The force of attraction between saw blade and magnet produced a measuring signal from the force transducer which was eventually registered after amplification, by means of a digital voltmeter.

For the purpose of calibration, an optical distance meter was placed in position parallel to the measuring unit, the rotating saw blade was deflected by means of compressed air currents of various strengths, and the distance values optically measured under these conditions and the corresponding reading on the voltmeter were recorded. It was consequently possible to correlate the values measured and read at that point with a certain saw blade deviation.

After completion of the calibration, a silicon bar (diameter approximately 150 mm, resistivity approximately 0.01 $\Omega$cm) cemented onto a carbon cutting strip was mounted in the usual manner on the feed platform and placed in the sawing position so as to be sawn up into wafers approximately 800 $\mu$m thick. The distance value (slicing tool/measuring unit) indicated immediately before the cutting edge penetrated the workpiece was always taken as the reference value ("zero").

Ten wafers were then sawn with the normal processing parameters and the path of the cut and the deviation of the saw blade from the reference plane were measured at the same time with the aid of the measuring unit and recorded by means of a plotter. After every slicing operation, the profile of the sawn end face of the crystal bar between the top of the bar and the base of the bar was also measured with the aid of an optical sensor and recorded. A comparison of the two measuring curves showed excellent agreement for every wafer.

COMPARISON EXAMPLE

The measuring unit according to the invention was then removed and replaced in the same position by a conventional eddy current sensor, after which a further ten wafers were sawn after suitable calibration under otherwise identical conditions. In this case, too, the path of the saw blade was tracked during the slicing operation and recorded by means of the plotter. The sawn end face of the silicon bar was likewise measured optically. For all the wafers, marked deviations between the optically recorded measuring curve and that recorded by means of the eddy-current sensor were now to be detected; the difference amounted to up to 120 $\mu$m. These distortions in the measurement result are due, in a substantial measure, to the effect of the high-resistance material, but also to that of the cooling and lubricating agent fed in during sawing.

While only several embodiments of the present invention has been shown and described, it will be obvious that many changes and modifications may be made thereto without departing from the spiral and scope of the invention.

What is claimed is:

1. In a method for continuously or periodically monitoring the path of the cut in slicing wafers from non-magnetizable generally bar-shaped crystalline workpieces with a slicing tool which is moved through the workpiece and which is manufactured, at least partly, from magnetizable material by measuring the magnetic interactions between the slicing tool and a measuring unit, the improvement comprising the steps of:
   providing generally bar-shaped or block-shaped crystalline semiconductor workpieces adjacent to said slicing tool;
   disposing said measuring unit in a defined position with respect to said slicing tool;
   establishing a constant magnetic field between the measuring unit and slicing tool which magnetic field, during the slicing process, passes, at least partly, through the wafer to be sliced off; and,
   measuring the change in the constant field caused by the deviation of the slicing tool wherein the semiconductor wafer slice produced is between 0.1 to 1.0 mm thick.

2. The method as claimed in claim 1, wherein said measuring step comprises measuring the force of attraction between the slicing tool and the measuring unit.

3. The method as claimed in claim 1, wherein said measuring step comprises measuring the magnetic flux density.

4. The method as claimed in claim 1, additionally including the step of simultaneously measuring the deviation of the slicing tool outside the wafer to be sliced off by means of at least one further measuring unit.

5. The method as claimed in claim 1, wherein said establishing step is produced by means of a plurality of individual magnets.

6. The method as claimed in claim 1, wherein said establishing step is produced by means of permanent magnets or electromagnets.

7. The method as claimed in claim 1, wherein said establishing step produces a constant magnetic field whose field lines encounter the slicing tool essentially perpendicularly.

8. An apparatus for continuously or periodically monitoring the path of the cut in slicing wafers from non-magnetizable generally bar-shaped crystalline workpieces with a slicing tool which is moved through the workpiece and which is manufactured, at least partly, from magnetizable material by measuring the magnetic interactions between the slicing tool and a measuring unit, comprising:
- means for holding a generally bar-shaped or block-shaped crystalline semiconductor workpiece adjacent to said slicing tool; and,
- a measuring unit for establishing a constant magnetic field and for measuring changes therein, said measuring unit being disposed in a defined position with respect to the slicing tool in a manner such that, during the slicing operation, the constant field interacts with the slicing tool, at least partly, through the wafer to be sliced off wherein the semiconductor wafer slice produced is between 0.1 to 1.0 mm thick.

9. The apparatus as claimed in claim 8, additionally including means for screening the constant magnetic field in the region facing away from the slicing tool.

10. The apparatus as claimed in claim 8, wherein said measuring unit includes a plurality of magnets distributed over an area to establish said constant magnetic field.

11. The method as claimed in claim 1, wherein said workpieces are semiconductor workpieces.

12. The apparatus as claimed in claim 8, wherein said workpieces are semiconductor workpieces.

* * * * *